(12) United States Patent
Ottelli

(10) Patent No.: US 10,025,326 B2
(45) Date of Patent: Jul. 17, 2018

(54) THERMOSTATIC MIXER VALVE

(71) Applicant: ARTIS S.r.l., Brescia (BS) (IT)

(72) Inventor: Giordano Ottelli, Brescia (IT)

(73) Assignee: Riobel Inc., Saint-Jerome, Quebec (CA)

( * ) Notice: Subject to any disclaimer, the term of this patent is extended or adjusted under 35 U.S.C. 154(b) by 434 days.

(21) Appl. No.: 14/423,777

(22) PCT Filed: Aug. 30, 2013

(86) PCT No.: PCT/IB2013/058160
§ 371 (c)(1),
(2) Date: Feb. 25, 2015

(87) PCT Pub. No.: WO2014/033678
PCT Pub. Date: Mar. 6, 2014

(65) Prior Publication Data
US 2015/0220090 A1    Aug. 6, 2015

(30) Foreign Application Priority Data

Aug. 30, 2012 (IT) .............................. BS2012A0131

(51) Int. Cl.
G05D 23/13    (2006.01)
(52) U.S. Cl.
CPC ......... *G05D 23/134* (2013.01); *G05D 23/136* (2013.01); *G05D 23/1346* (2013.01)
(58) Field of Classification Search
CPC .... G05D 23/13; G05D 23/132; G05D 23/134; G05D 23/1346; G05D 23/136
See application file for complete search history.

(56) References Cited

U.S. PATENT DOCUMENTS 4,166,575 A    9/1979 Sassi
5,299,593 A    4/1994 Ottelli
(Continued)

FOREIGN PATENT DOCUMENTS

CA    2631164 A1    6/2007
FR    2294372 A1    7/1976
(Continued)

OTHER PUBLICATIONS

International Search Report for International App. No. PCT/IB2013/058160 dated Feb. 10, 2014 (3 pages).
(Continued)

*Primary Examiner* — Jonathan Bradford
(74) *Attorney, Agent, or Firm* — Calfee, Halter & Griswold LLP

(57) ABSTRACT

A mixer valve for sanitary fixtures is provided. The mixer valve includes a pressure regulator, a piston, a thermostatic element, and a flow diverter. The pressure regulator is operable to regulate hot water flow from a hot water inflow opening and cold water flow from a cold water inflow opening to a mixing chamber. The piston is operable to regulate a temperature of mixed water flow resulting from mixing of the hot water flow and the cold water flow in the mixing chamber. The thermostatic element is operable to move the piston in response to changes in the temperature of the mixed water flow. The flow diverter is operable to divert the mixed water flow from the mixed water outflow opening to multiple connected users. The pressure regulator is fluidically upstream of the piston and the thermostatic element. The piston and the thermostatic element are fluidically upstream of the flow diverter. The flow diverter is located inward of the pressure regulator in the mixer valve or between: (1) the pressure regulator and (2) the piston and the thermostatic element.

21 Claims, 5 Drawing Sheets

(56) References Cited

U.S. PATENT DOCUMENTS

| | | | |
|---|---|---|---|
| 5,344,067 A | 9/1994 | Axelsson et al. | |
| 5,884,652 A * | 3/1999 | Yeh | E03C 1/04 |
| | | | 137/597 |
| 7,850,088 B2 | 12/2010 | Wei et al. | |
| 2003/0101510 A1 | 6/2003 | Ottelli | |
| 2004/0238650 A1 | 12/2004 | Luig | |
| 2008/0164330 A1 | 7/2008 | Wei et al. | |
| 2012/0222763 A1 | 9/2012 | Yang | |

FOREIGN PATENT DOCUMENTS

| | | |
|---|---|---|
| GB | 1280799 A | 7/1972 |
| GB | 1291723 A | 10/1972 |
| WO | 1979000697 A1 | 9/1979 |
| WO | 1997032147 A1 | 9/1997 |
| WO | 2006126222 A1 | 11/2006 |
| WO | 2007072526 A1 | 6/2007 |

OTHER PUBLICATIONS

Written Opinion of the Internation Searching Authority for International App. No. PCT/IB2013/058160 dated Feb. 10, 2014 (6 pages).

Communication pursuant to Article 94(3) EPC issued by the European Patent Office for European App. No. EP 13 785 646.4 dated May 19, 2016 (4 pages).

Closure of the procedure issued by the European Patent Office for European App. No. EP 13 785 646.4 dated Apr. 10, 2017 (1 page).

First office action issued by the Mexican Institute of Industrial Property for Mexican App. No. MX/a/2015/002417 dated May 13, 2016 (3 pages).

Notice of grant issued by the Mexican Institute of Industrial Property for Mexican App. No. MX/a/2015/002417 dated Nov. 16, 2016 (1 page).

* cited by examiner

THERMOSTATIC MIXER VALVE

FIELD OF THE INVENTION

The present invention relates in general to the field of taps and fittings and in particular to a mixer valve of hot and cold water for sanitary fixtures, provided with thermostatic regulator. The present application claims the priority of the Italian Patent Application BS2012A000131 filed on Aug. 30, 2012.

STATE OF THE ART

In the field of taps and fittings, cartridge mixer valves are long known that can be inserted in a tap body, provided with separate inlets for hot and cold water and having means for intercepting such inlets, means for regulating the flow rate and means for changing the mixing ratios of the two kinds of water according to the temperature of mixed water to be supplied through an outlet.

In general there are mixer valves provided with a thermostatic regulator as well as valves without such an element.

In valves without thermostatic regulator, the opening and closing of the valve, the flow rate regulation of the supplied mixed water, including the change of mixing ratios of hot and cold water, are made by hand operating a control lever of the valve itself.

In valves provided with thermostatic regulator, the change of mixing ratios of hot and cold water is automatically carried out by regulating means which keep as much as possible constant the temperature of the supplied mixed water over time.

Generally, the thermostatic regulator comprises two sets of side holes for separately inflowing hot water and cold water at different positions along its longitudinal axis. The regulator is coaxially inserted in a corresponding tap body. The cold water and the hot water are separately supplied to the corresponding side holes of the thermostatic regulator through two annular chambers defined between the thermostatic regulator and the tap body. The hot and cold water mixing takes place in the thermostatic regulator, at an inner mixing chamber which opens outwards through an outlet hole provided at the bottom of the tap body. Generally, the thermostatic regulators comprise a heat-sensitive sensor, for example a wax sensor or a metal bulb, proportionally expanding according to the temperature change of water passing in the mixing chamber so as to control the axial movement of a regulator of flow rates of hot water and cold water supplied through the side holes of the thermostatic regulator itself, and accordingly to feedback regulate the temperature of mixed water outgoing from the tap.

One of the drawbacks of traditional solutions is that the heat-sensitive sensor operates properly only if hot water and cold water are homogeneously mixed in the inner mixing chamber in which the sensor operates and the pressure amount of the two flow rates of water (hot and cold) incoming in the valve considerably affects the mixing.

For this reason, technical solutions have been suggested where a pressure balancer is hydraulically connected with valve inlets of hot and cold water. The pressure balancer is formed so as to compensate for pressure changes of the water coming from the water supply system and to prevent, in this way, pressure changes of flow rates of hot water and cold water incoming in the mixer valve.

However, the pressure balancer is a stand-alone unit coupling with the mixer valve either directly or by interposing hydraulic connections, thus increasing the overall dimensions and complexity of the assembly.

At the same time the conventional mixer valves are also combined with a flow diverter.

The flow diverter is a stand-alone component hydraulically connected downstream the mixer valve to allow to selectively change the outgoing flow towards one or more users. For example, in a bathtub or shower, the flow diverter can discharge the flow of water from the siphon or hand held shower head, and vice versa.

However, in light of the above, it is found very complex and difficult to arrange a flow regulator or diverter as a retrofit in pre-existing systems, due to bulk and mounting problems.

A further drawback of the traditional solutions lies in the fact that, when the valves are closed, they are often subjected to a minimum, but undesirable, water leakage from the valve itself, that is to say delivered from the tap. The leakage is due to the closure of conventional valves that is obtained by manually displacing the valve components in abutment one over another to intercept the outflow and such components are often made with dimensional tolerances preventing the water tightness, especially in case of high pressures and temperatures.

OBJECT OF THE INVENTION

Therefore, it is an object of the invention to provide a thermostatic mixer valve improved with respect to the prior art, in particular a mixer valve being effective even in case of pressure changes of the hot water and cold water flows coming from the valve itself, and which is even compact to minimize the bulks and facilitate the installation in narrow spaces.

It is a further object of the present invention to provide a mixer valve characterized by being, when closed, free from leakages of water from the tap, particularly cold water.

A further object of the present invention is to provide a mixer valve combined with a corresponding flow diverter according to a compact arrangement minimizing the overall bulks.

SUMMARY OF THE INVENTION

These and other objects are obtained by a thermostatic valve as described below.

In particular, the thermostatic valve for mixer taps comprises a valve body provided with a longitudinal axis and internally provided with a chamber for mixing water. Side openings, separate from each others, for inflowing hot water and cold water to the mixing chamber are arranged at different heights of the valve body with respect to the longitudinal axis. Automated regulating means operate to intercept the inflowing side openings such as to allow to control the flow rates of hot water and cold water.

The automated regulating means further comprise a thermostatic bulb operatively arranged in the mixing chamber and a regulating element or piston for regulating the flow rates of hot water and cold water; the piston is movable along the longitudinal axis in order to feedback close, completely or partially, and selectively, the inflowing side openings, wholly in response to the expansions the thermostatic bulb is subjected to.

In particular, the valve body comprises a first connecting portion extending downstream of said discharge opening shaped so as to snap fit mechanically and fluidically with a second connecting portion of a pressure regulator. The function of the latter is to regulate the flows of hot water (C) and cold water (F), being still integrated in the valve body. In this way the valve body is, in use, in one-piece incorporating the pressure regulator, thereby considerably reducing the overall dimensions with respect to traditional solutions.

In a preferred embodiment, the first and the second connecting portion of the pressure regulator are shaped so as to define an inner housing chamber in which a movable partitioning diaphragm alternately slides along a translation axis substantially orthogonal to the axis X-X of the valve body. In particular, the partitioning diaphragm divides the housing chamber in a first and a second chamber portion, so as to feedback change the volume of the two chamber portions in response to the pressure of the incoming water flows.

In other words, the pressure regulator is substantially positioned below the mixing chamber, on the opposite side with respect to the piston, and comprises an inner volume that a diaphragm divides into two chambers, in which hot water and cold water are supplied, respectively. In response to the pressures of the two incoming water flows, the diaphragm feedback moves along an axis Y-Y transversely the longitudinal axis X-X of the valve, in order to compensate for any possible pressure transient. The diaphragm movement causes the volume of one of the two chambers to increase or decrease and, therefore, the volume of the other chamber decreases or increases. Thus the flow pressures of cold water directed from the balancer to the valve are almost constant over time.

More particularly, the partitioning diaphragm comprises a first hollow tubular element and a second tubular element slidable inside it along the translation axis Y-Y. The first tubular element comprises first cutouts obtained on the side wall and fluidically connected to the inlet of hot water and cold water flows.

The second tubular element is substantially hollow and is divided in two chambers and comprises second cutouts obtained in a central portion of the side wall and closed portions obtained on ending portions of the side wall.

In response to the pressure change of the incoming flows of hot water and cold water, the second tubular element translates with respect to the first tubular element, causing the first and second side cutouts to partially or completely overlap and/or the partial or complete overlapping of the first cutouts and the closed ending portions. This produces a volume change of the first and second chamber portion such as to regulate the pressure of the two incoming flows.

Preferably, the valve body comprises a first lower element, named distributing body, substantially shaped as a cup and in which the mixing chamber is defined and opens towards a discharge opening, and a second upper element, defined headwork, sealingly constrained to the distributing body. In particular a third in-between element is provided, named towing element, arranged coaxial with the headwork.

The first connecting portion is integrated in the valve body.

In particular the distributing body has a narrowing section with a substantially funnel shape at the discharge opening. The first connecting portion extends from the narrowing section and is shaped as a portion of substantially the same diameter as the distributing body.

In particular, the first connecting portion has first face including a first portion of the housing chamber. Similarly, the second connecting portion has a second face including a second portion of the housing chamber. The first and the second chamber portions are substantially symmetrical to each other. A gasket is interposed between the first and the second connecting portion and is housed in a corresponding groove.

Preferably, the groove and the gasket respectively have a length peripherally extending along the edge of the connecting portions, and a second length substantially encircling the housing seat.

Further, the gasket has an annular portion encircling in use the movable diaphragm arranged in the housing seat.

Preferably, the first and the second portions are removably coupled one to another by way of connecting means, specifically snap means. In a preferred embodiment the connecting means include two teeth obtained on the first portion that snap fit into respective notches that are on the second connecting portion.

Advantageously, the two connecting teeth and the respective notches are of different dimensions. This allows a user to identify the proper assembling orientation of the second connecting portion with respect to the first connecting portion, therefore facilitating the assembly thereof.

Preferably, downward said housing chamber said second portion comprises a first and second non-return valves to control the incoming flow of hot and cold water, respectively.

Preferably, above the pressure regulator, a flow diverter integrated in the distributing body is further provided, facing towards the mixing chamber. The flow diverter allows to selectively or simultaneously divert the flow of mixed water to several connected users. The diverter is preferably of ceramic-disk type.

Preferably the flow diverter comprises a fixed plate and a movable plate rotatably rested on the fixed plate. The plates are provided with through holes that can be aligned. The two plates allow to selectively or simultaneously divert the mixed water to different users, such as a bathtub, a shower, a hand held shower head, etc.

Even in this case, because the flow diverter is integrated in the valve body, it is possible a considerable downsizing with respect to traditional solutions in which both the pressure regulator and the flow diverter are external and stand-alone devices fluidically connected to the mixer valve.

In an embodiment of the mixer valve, the piston is crossed by a plurality of ducts fluidically connecting the side opening inflowing the cold water to the mixing chamber.

Advantageously, the flow of cold water cannot make a full use of the ducts, in that they have at least one throttling whose function is to accelerate the flow of cold water directed to the mixing chamber.

Compared to traditional solutions using pistons with clear ducts, the valve according to the present invention comprises a piston whose ducts have at least one throttling forcing the flow acceleration of cold water, causing the cold water to flow into the mixing chamber with a turbulence greater than the turbulence occurring in traditional solutions. This leads to optimize the mixing with the hot water and, therefore, involves an optimal operation of the thermostatic bulb, even in case of upstream changes of the water supply pressure.

In other words, the configuration suggested for the piston, for which the Applicant reserves to file a divisional application, allows to maximize the mixing of the flow rates of hot and cold water largely compensating for pressure changes and therefore limiting the transients of the thermostatic bulb.

Preferably, the piston is substantially toroidal and is assembled in the valve body coaxial with the longitudinal axis. The piston comprises a central portion fitted on the thermostatic bulb and a peripheral portion intended for intercepting selectively the inflowing side openings of hot water and cold water. The cold water flows through ducts that are in-between the central portion and the peripheral portion and that completely cross the piston.

Preferably the throttling of each duct is defined by a radial projection of the central portion or a radial projection of the peripheral portion, or else it is defined by opposite projections of the central portion and the peripheral portion. It has been found that the throttling limits the usable section of ducts, that is to say the section the cold water could use if there were no projections.

More preferably, the radial projections extend at an initial admission length of the respective duct, namely in the upper part of the duct facing the inlet of cold water.

According to a preferred embodiment, the piston ducts have, in a plane orthogonal to the longitudinal axis, a C or U shape, and they are oriented in a radial direction with respect to the same longitudinal axis.

In a preferred embodiment a gasket is further provided, for example a silicon gasket, interposed between the headwork and the piston to assure the sealing against the leakage of cold water into the mixing chamber when the piston is in the position of minimum distance from the headwork.

This feature helps to prevent an undesirable inflow of cold water into the mixing chamber from interfering with the proper operation of the thermostatic bulb or anyway from affecting the temperature of the only hot water required by the user.

In a preferred embodiment, the piston comprises a neck portion arranged to integrally lock the thermostatic bulb. In particular, the neck has a preferably hexagonal seat engaging a screw element, particularly a hexagonal nut, by means of shape coupling. The nut is coupled, in turn, to the thermostatic bulb, preferably by means of a screw coupling.

This allows the thermostatic bulb to be kept in a stable position during its operation, avoiding any slightest movement in the longitudinal direction.

Preferably, at the towing element a reference snap element is arranged and operatively coupled, in use, to a reference ring housed in the distributing body. The ring is provided with notches in which the reference element snap-engages to identify a predetermined angular position of the towing element and the headwork with respect to the distributing body.

LIST OF THE FIGURES

Further characteristics and advantages of the present invention will be more evident from a review of the following specification of a preferred, but not exclusive, embodiment, shown for illustration purposes only and without limitation, with the aid of the attached drawings, in which.

DETAILED DESCRIPTION OF THE INVENTION

The enclosed figures show the preferred embodiment of the mixer valve 1 according to the invention, substantially in the form of a cartridge that can be inserted in a corresponding tap body (not shown).

Figure 1:
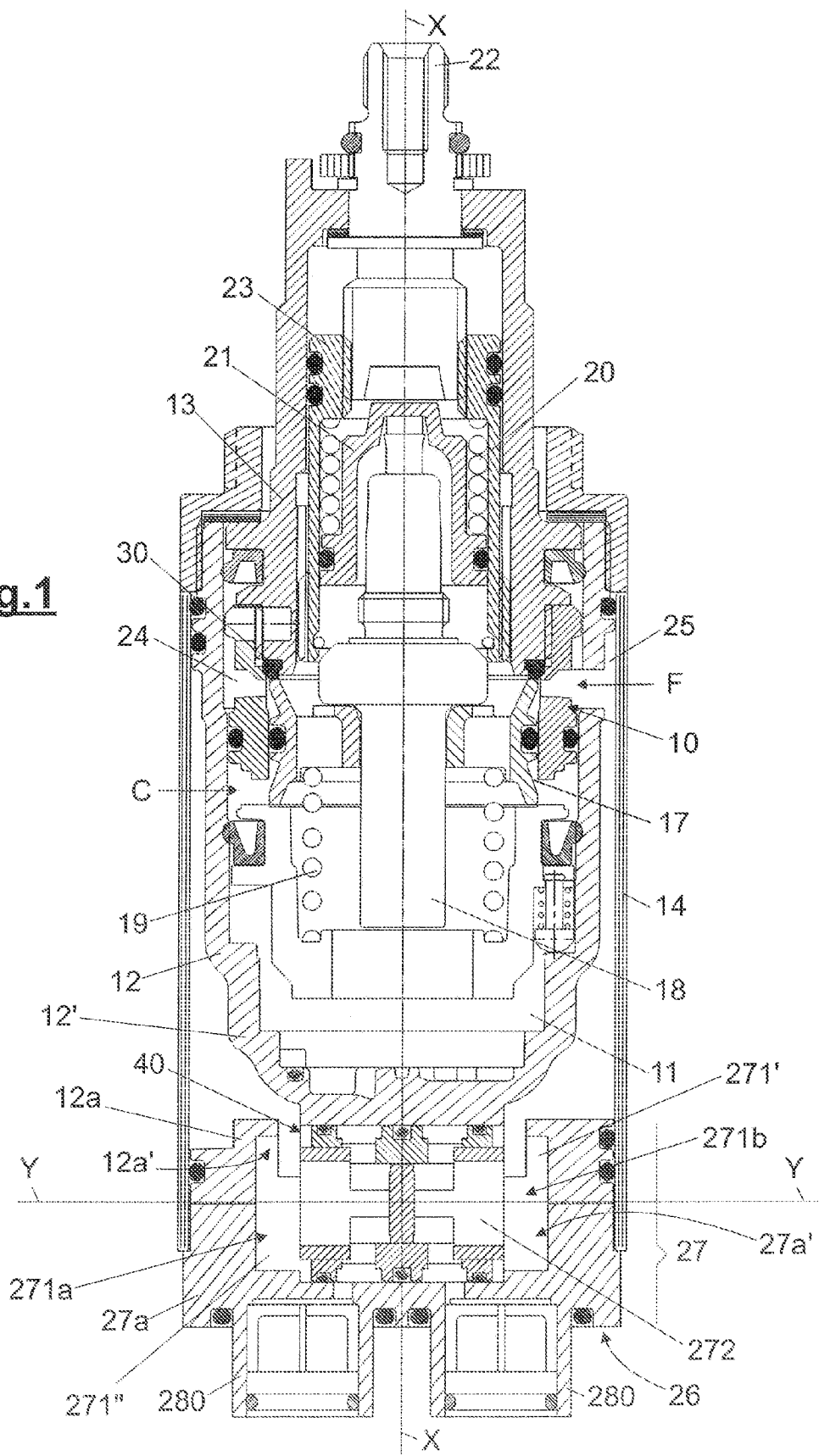
FIG. 1 is a longitudinal section view of the mixer valve according to the present invention.
Figure 2:
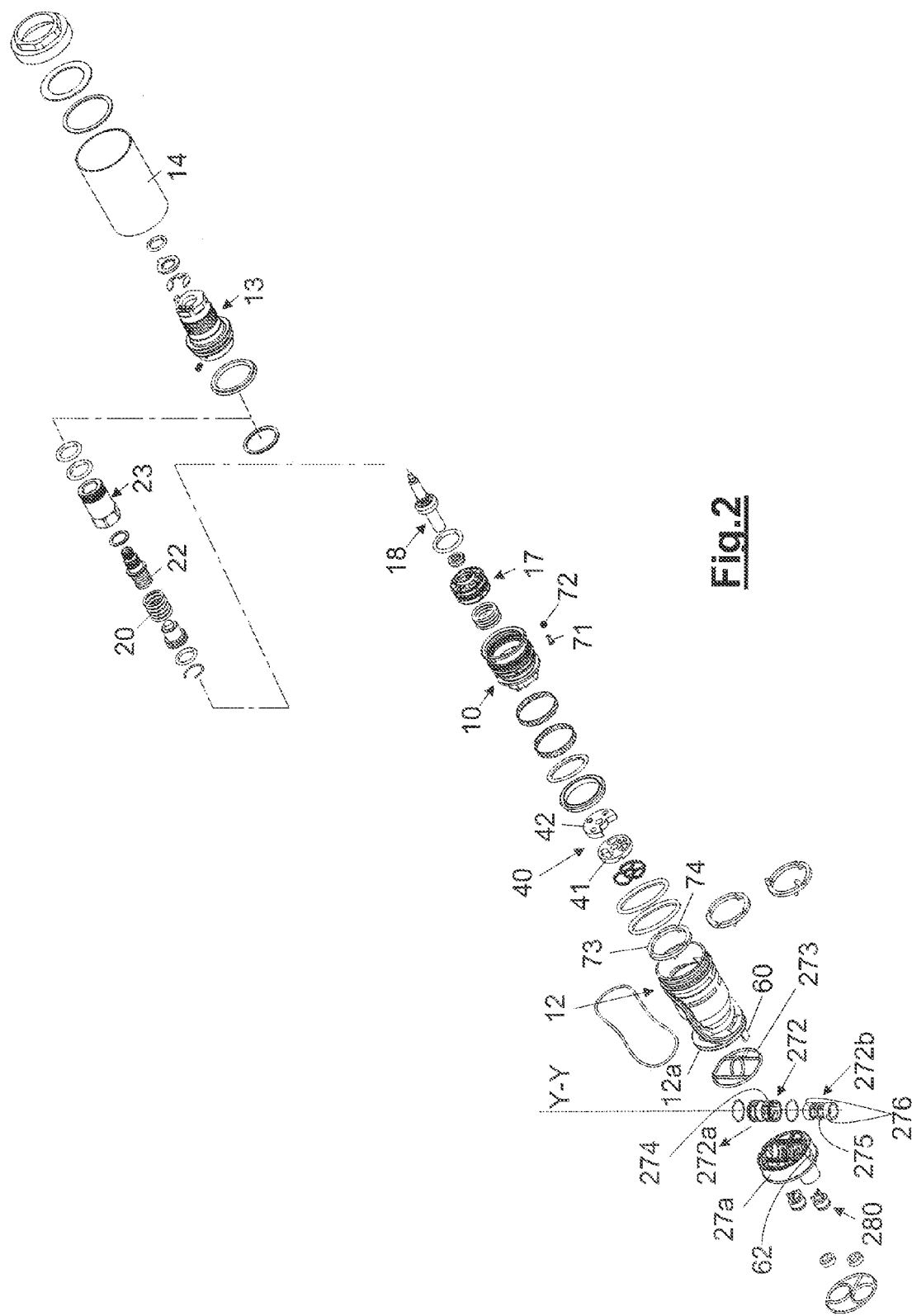
FIG. 2 is a perspective and exploded view of the mixer valve shown in FIG. 1.

With particular reference to FIGS. 1 and 2, the mixer valve 1 comprises a plurality of stacked elements coupled one on top of the other. In particular it includes a valve body comprising a first lower element 12, hereinafter named distributing body, substantially shaped as a cup, and a second upper element 13, hereinafter named headwork, sealingly constrained to each other and enclosing other operational components of the mixer valve 1 and, in particular, a third in-between element 10, named towing element.

These are housed in a cylindrical portion 14.

In particular, within the distributing body 12 a mixing chamber 11 is defined in which a distributing element 17, 17' is housed, hereinafter named piston, operating to regulate the inflow rates of hot water and cold water coming into the mixing chamber 11 in order to regulate the temperature of the supplied mixed water.

The piston 17, 17' is coupled, in a known way, to a thermostatic bulb 18 and is capable of axial movements in response to temperature changes the thermostatic bulb 18 is subjected to due to changes in pressure and/or flow rate and/or temperature of the incoming flows of hot water and cold water into the mixer valve 1. The temperature changes occurring in the thermostatic bulb 18 cause the latter to expand; the bulb 18 touches the water flowing through the mixing chamber 11 and is affected by its temperature and, expanding in different ways depending on the water temperature, it controls the movements of the piston 17, 17'.

According to the operating principle, the piston 17, 17' because of its axial movement, intercepts completely or partially, and selectively, the openings 24 and 25 obtained through the distributing body 12 and the towing element 10 for regulating, correspondingly, the flow rates of hot water and cold water respectively supplied to the openings 24 and 25 and directed to the mixing chamber 11.

In the section shown in FIG. 1, the position of the piston 17 is of maximum elevation, so it is in abutment against the headwork 13 so as to close the inlet 25 of cold water F. In the position of maximum reciprocal distance of the piston 17, 17' from the headwork 13 (not shown in figures) these elements are detached and the gap between them allows the hot water to enter the opening 24.

Two different opposed springs 19 and 20, a lower and an upper one, countercheck the vertical movements of the piston 17, 17' and are respectively interposed between the piston 17, 17' itself and the towing element 10 and between a cap 21 resting on the top of the thermostatic bulb 18 and a slider 23 axially sliding in the headwork 13.

The user sets the temperature of the mixed water by means of a knob (not shown) fixed to the rotating shaft 22 combined with the thermostatic bulb 18 by way of the slider 23 which engages the upper spring 20 and, through it, the cap 21 fitted on the bulb 18 itself.

Therefore, the temperature of mixed water in the mixing chamber 11 is feedback regulated in response to the expansions the thermostatic bulb 18 is subjected to, in order to remain almost constant over time.

In other words, in response to the expansions of the thermostatic bulb 18, the piston 17, 17' moves to a precise position within its available stroke, at which it intercepts completely, partially, or not at all, the inflowing openings 25 and 24 of cold water F and hot water C, respectively.

The reference numeral 26 shows the discharge opening for discharging the mixed water outside of the mixer valve 1, as described later.

The flows of hot water and cold water reach the inlet passages 24, 25 through ducts (not shown) connected to the tap body, for example the duct of the water supply system and the duct from the boiler.

In particular, as shown in FIG. 2, the distributing body 12 comprises a first connecting portion 12a shaped so as to mechanically and fluidically couple with a second connecting portion 27a of a pressure regulator 27 adapted to regulate the flow rates of hot water (C) and cold water (F). The pressure regulator 27 is thus integrated in the distributing body 12 so as to minimize the overall bulks with respect to the traditional solutions. In this case, in fact, the pressure regulator 27 is a single piece with the whole valve body 12, 13.

In detail, the first connecting portion 12a is integrated to the distributing body 12; the latter has a substantially funnel-shaped narrowing section 12'. The first connecting portion 12a extends from the narrowing section 12' and is substantially of the same diameter as the distributing body 12. Thereby the narrowing section 12' is shaped to house a flow diverter 40, as will be described later.

Figure 3:
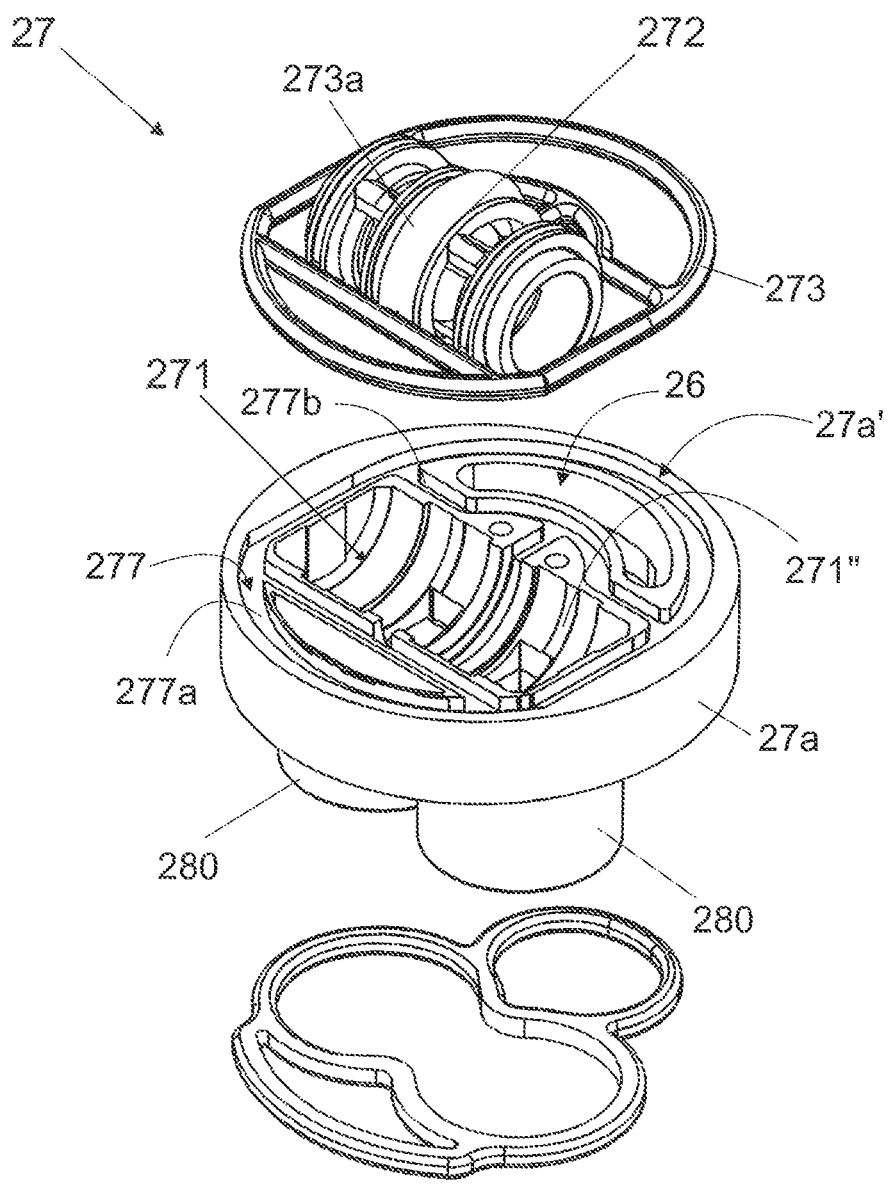
FIG. 3 is a perspective and exploded view of a mixer valve component shown in FIGS. 1 and 2.

More particularly, as shown in FIGS. 1 and 3, the first 12a and the second 27a connecting portions are shaped so as to define an inner housing chamber 271 in which a movable partitioning diaphragm 272 alternately slides along a translation axis substantially orthogonal to the axis X-X of the valve body.

In detail, the first connecting portion 12a has a first face 12a' comprising a first portion 271' of the housing chamber 271. Similarly, the second connecting portion 27a has a second face 27a' with a second portion 271" of the housing chamber 271. The first 271' and the second 271" chamber portions are substantially symmetrical to each other and when they are coupled together they form the housing chamber 271.

Operatively, the partitioning diaphragm 272 divides the housing chamber 271 into a first 271a and a second 271b chamber portion, so as to feedback change the volume of the two chamber portions 271a, 271b in response to the pressure of the incoming water flows (FIG. 2).

In other words, the above described pressure regulator 27 is positioned substantially below the mixing chamber, on the opposite side with respect to the piston, and comprises an inner volume divided by a diaphragm 272 into two chambers 271a, 271b in which hot water and the cold water are supplied, respectively. In response to the pressures of the two incoming flows of water, the diaphragm 272 feedback translates along the axis Y-Y substantially transverse to the longitudinal axis X-X of the valve, to compensate for any possible pressure transient. The movement of the partitioning diaphragm 272 causes the volume of one of the two chambers to increase or decrease and thus the volume of the other chamber decreases or increases. Thus the flow pressures of cold water directed from the balancer to the valve are almost constant over time.

More particularly, referring to FIG. 2, the partitioning diaphragm 272 comprises a first tubular element 272a and a second tubular element 272b telescopically coupled with each other along the translation axis Y-Y. The first tubular element 272a comprises first cutouts 274 obtained on the side wall and fluidically connected to the inlet of hot water and cold water flows of the second connecting portion 27a.

The second tubular element 272b comprises second cutouts 275 obtained in a central portion of the side wall and closed portions 276 obtained on ending portions of the side wall.

In response to the change of pressure of the incoming flows of hot water and cold water, the second tubular element 272b feedback translates with respect to the first tubular element 272a, causing the first 274 and the second 275 side cutouts to partially or completely overlap, and/or the partial or complete overlapping of the first cutouts 274 and the closed portions 276. This produces a flow rate change in the first 271a and second 271b chamber portion such as to regulate the pressure of the two incoming flows.

According to other advantageous manufacturing aspects, between the first 12a and the second 27a connecting portion of the pressure regulator 27 a gasket 273 housed in a corresponding groove 277 is interposed. The groove 277 and the gasket 273 have a length 277a, shown in FIG. 3 only referring to the groove, peripherally extending at the edge of the connecting portions. On the other hand, a second length 277b encircles the centrally obtained housing chamber 271. Further, the gasket 273 is provided with an annular portion 273a encircling in use the movable diaphragm 272 arranged in the housing seat 271.

According to more manufacturing details, the first 12a and the second 27a connecting portion are removably coupled to each other by way of connecting means 60, 62, specifically snap means. In a preferred embodiment the locking means includes two connecting teeth 60 (FIG. 2) obtained on the first portion 12a that snap engage in respective notches 62 on the second connecting portion 27a.

The two connecting teeth 60 and the respective notches are of different dimensions. This allows a user to identify the proper assembling orientation of the second connecting portion 12a with respect to the first connecting portion 12a therefore facilitating the assembly.

The second connecting portion is also provided with a non-return valve 280 for the incoming hot water flow and cold water flow, respectively.

In a preferred embodiment, a flow diverter 40, better shown in FIG. 2, is provided integrated in the distributing body 12 substantially at the narrowing section 12'.

The flow diverter 40 faces towards the mixing chamber 11 above the pressure regulator 27. The flow diverter 40 allows to divert the flow of mixed water to multiple connected users selectively or contemporaneously. The diverter is preferably of ceramic-disk type.

As best shown in FIG. 2, the flow diverter 40 comprises a fixed plate 41 housed in the narrowing section 12' inside the distributing body 12, and a movable plate 42, supported and rotatable relative to the fixed plate 41, which rotates integral with the towing element 10. Each of the plates 41, 42 comprises through holes that can be aligned to each other upon the relative movement of the two plates so as to allow to divert the water flow.

Another advantageous technical feature, shown in FIG. 2, consists of arranging a reference snap element 71, operated by a spring 72, at the towing element 10. In use, the latter is operatively connected to a reference ring 73 housed in the distributing body 12. The ring 73 is provided with notches 74 in which the reference element 71 snap engages to identify a predetermined angular position of the towing element 10 and headwork 13 with respect to the distributing body 12.

Figure 4:
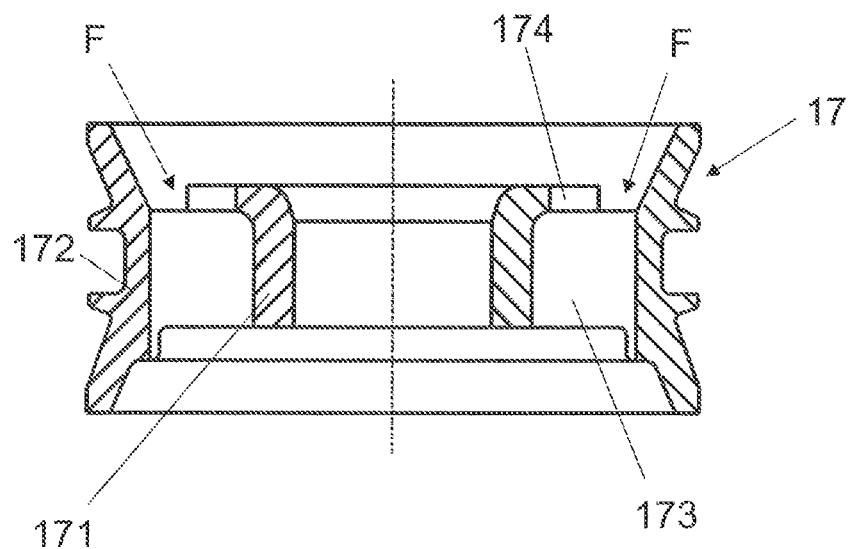
FIG. 4 is section view of a piston component of the mixer valve shown in FIG. 1.
Figure 5:
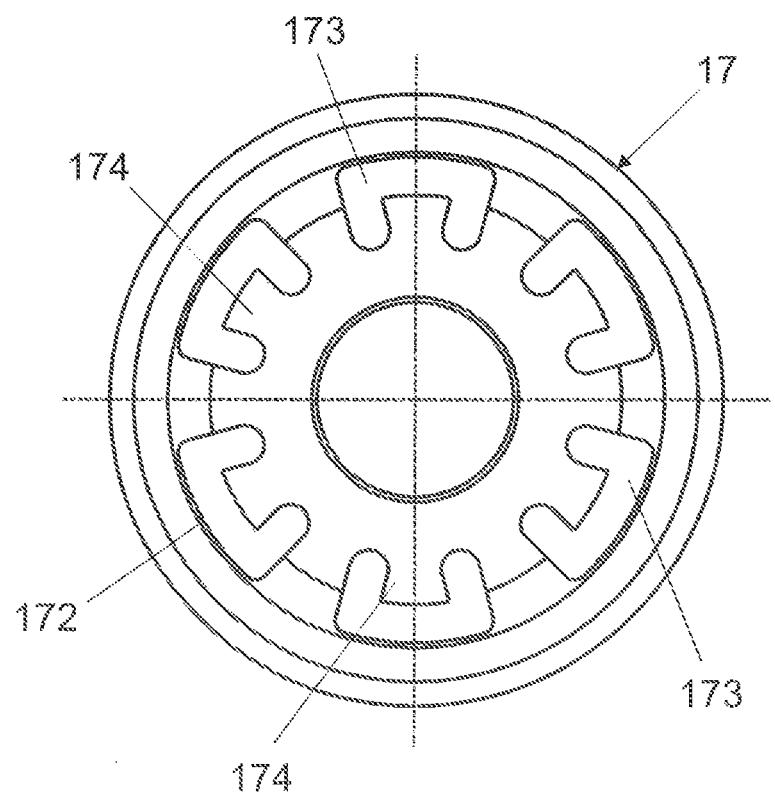
FIG. 5 is a top plan view of the component shown in FIG. 4.
Figure 6:
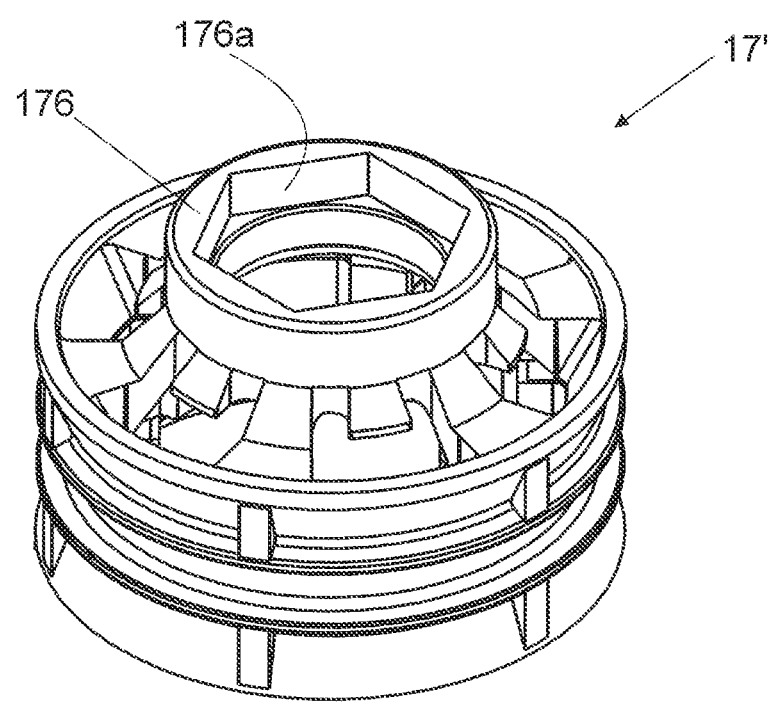
FIG. 6 is a perspective view of a second embodiment of the piston component of FIG. 4.

Referring to FIGS. 4 to 6, two advantageous alternative embodiments are shown for the piston 17, 17' forming the mixer valve 1; these embodiments disclose a geometric shape different from the known solutions. Referring particularly to FIGS. 4 and 5 and 6, the piston 17, 17' is a substantially toroidal element comprising a central portion 171 which defines the receiving hole for the bulb 18 and a peripheral portion 172 intended to abut against the towing element 10 sideways and against the headwork 13 on the upper part, particularly against a gasket to be described later. Between the central portion 171 and the peripheral portion 172 several traversing ducts 173 for the cold water are defined. The ducts 173 are regularly and circumferentially spaced around the central portion 171.

The cold water coming into the mixer valve 1 through the opening 25, flows through the ducts 173 of the piston 17 (arrow F in FIGS. 1 and 4) to flow into the mixing chamber 11 where it will mix with the hot water fed through the opening 24.

Unlike traditional solutions, the through ducts 173 are not completely clear, but are partially throttled by projections 174 radially extending from the central portion 171. Actually, each radial projection 174 partially clogs the corresponding duct 173 causing an increased pressure drop in the incoming flow of cold water and its resultant acceleration.

Compared to a traditional clear duct, the throttled ducts 173 involve that the degree of mixing of hot water and cold water in the mixing chamber 11 is optimized. The cold water F is strongly accelerated and it flows into the chamber 11 faster than in case of traditional solutions, so as to maximize the turbulences and, accordingly, have a uniform mixing. This results in an efficient operation of the bulb 18: actually the optimal mixing of the flows of cold water F and hot water C has an effect compensating for any pressure changes that usually occur in water supply systems, meaning that the bulb 18 is therefore insensitive to these changes.

The projections, or throttlings, 174 can be of different shape according to the requirements. For example, the projections 174 may also extend from the peripheral portion 172 of the piston 17 and can be of rounded or squared profile, etc.

Preferably, as shown in FIG. 1 and in FIG. 2, the mixer valve comprises a gasket 30 interposed between the headwork 13 and the piston 17. This gasket 30 can be used regardless of the piston shape 17.

The gasket 30, for example an O-Ring, is preferably locked on the headwork 13 at its lower end where the piston 17, 17' should abut when in the respective closing position of the opening 25. In the embodiment shown in figures, the gasket 30 is shaped and locked on the headwork 13 by the towing element 10 that is screwed just on the headwork so as to grip the gasket 30 between them.

Therefore, the piston 17 pushed by the spring 19 abuts against the gasket 30, unlike the known solutions in which it was pushed straight against the headwork, actually preventing any leakage of cold water towards the mixing chamber 11 even if the water pressure exceeds the average.

Advantageously, without leakage it is possible for the bulb 18 to operate in the best possible way and to really keep constant the temperature of the supplied mixed water, even when the proportion of hot water is very small or the temperature is low.

In the alternative embodiment of FIG. 6 the piston 17' comprises a neck portion 176 arranged to integrally lock the thermostatic bulb 18.

In particular, the neck 176 has a preferably hexagonal seat 176a engaging a screw element by shape coupling, particularly a hexagonal nut, not shown in detail.

The nut can be coupled in turn to the thermostatic bulb 18 advantageously providing a threaded portion for screwing the nut. In this way, the thermostatic bulb 18 is integrally locked to the neck portion 176 by means of the screw element; this improves its stability and prevents any oscillations during operation.

The invention claimed is:

1. A mixer valve, comprising:
   a hot water inflow opening, a cold water inflow opening, a mixing chamber, and a mixed water outflow opening;
   a pressure regulator, the pressure regulator being operable to regulate hot water flow from the hot water inflow opening and cold water flow from the cold water inflow opening to the mixing chamber;
   a piston, the piston being operable to regulate a temperature of mixed water flow resulting from mixing of the hot water flow and the cold water flow in the mixing chamber;
   a thermostatic element, the thermostatic element being operable to move the piston in response to changes in the temperature of the mixed water flow; and
   a flow diverter, the flow diverter being operable to divert the mixed water flow from the mixed water outflow opening to multiple connected users;
   wherein the pressure regulator is fluidically upstream of the piston and the thermostatic element;
   wherein the piston and the thermostatic element are fluidically upstream of the flow diverter; and
   wherein the flow diverter is located inward of the pressure regulator in the mixer valve.

2. The mixer valve of claim 1, further including a valve body, the valve body including an upper element, a lower element, and an in-between element.

3. The mixer valve of claim 2, wherein the valve body further includes a cylindrical portion.

4. The mixer valve of claim 1, wherein the pressure regulator includes a partitioning diaphragm, the partitioning diaphragm including a first hollow tubular element and a second hollow tubular element, the second hollow tubular element being operable to slide inside the first hollow tubular element.

5. The mixer valve of claim 1, wherein the piston includes a plurality of ducts connecting the cold water inflow opening to the mixing chamber, the ducts having a throttling to accelerate the cold water flow into the mixing chamber.

6. The mixer valve of claim 1, wherein the thermostatic element is a thermostatic bulb that is operable to expand based on the temperature of the mixed water flow.

7. The mixer valve of claim 1, wherein the flow diverter includes a fixed plate and a movable plate, the movable plate being operable to rotate relative to the fixed plate.

8. A mixer valve, comprising:
   a hot water inflow opening, a cold water inflow opening, a mixing chamber, and a mixed water outflow opening;
   a pressure regulator, the pressure regulator being operable to regulate hot water flow from the hot water inflow opening and cold water flow from the cold water inflow opening to the mixing chamber;
   a piston, the piston being operable to regulate a temperature of mixed water flow resulting from mixing of the hot water flow and the cold water flow in the mixing chamber;
   a thermostatic element, the thermostatic element being operable to move the piston in response to changes in the temperature of the mixed water flow; and
   a flow diverter, the flow diverter being operable to divert the mixed water flow from the mixed water outflow opening to multiple connected users;

wherein the pressure regulator is fluidically upstream of the piston and the thermostatic element;

wherein the piston and the thermostatic element are fluidically upstream of the flow diverter; and wherein the flow diverter is located between: (1) the pressure regulator and (2) the piston and the thermostatic element.

9. The mixer valve of claim 8, further including a valve body, the valve body including an upper element, a lower element, and an in-between element.

10. The mixer valve of claim 9, wherein the valve body further includes a cylindrical portion.

11. The mixer valve of claim 8, wherein the pressure regulator includes a partitioning diaphragm, the partitioning diaphragm including a first hollow tubular element and a second hollow tubular element, the second hollow tubular element being operable to slide inside the first hollow tubular element.

12. The mixer valve of claim 8, wherein the piston includes a plurality of ducts connecting the cold water inflow opening to the mixing chamber, the ducts having a throttling to accelerate the cold water flow into the mixing chamber.

13. The mixer valve of claim 8, wherein the thermostatic element is a thermostatic bulb that is operable to expand based on the temperature of the mixed water flow.

14. The mixer valve of claim 8, wherein the flow diverter includes a fixed plate and a movable plate, the movable plate being operable to rotate relative to the fixed plate.

15. A mixer valve, comprising:
a hot water inflow opening, a cold water inflow opening, a mixing chamber, and a mixed water outflow opening;
a valve body, the valve body having a central longitudinal axis;
a pressure regulator, the pressure regulator being operable to regulate hot water flow from the hot water inflow opening and cold water flow from the cold water inflow opening to the mixing chamber, the pressure regulator having a central longitudinal axis, the central longitudinal axis of the pressure regulator being orthogonal to the central longitudinal axis of the valve body;
a piston, the piston being operable to regulate a temperature of mixed water flow resulting from mixing of the hot water flow and the cold water flow in the mixing chamber, the piston having a central longitudinal axis, the central longitudinal axis of the piston being coaxial with the central longitudinal axis of the valve body;
a thermostatic element, the thermostatic element being operable to move the piston in response to changes in the temperature of the mixed water flow; and
a flow diverter, the flow diverter being operable to divert the mixed water flow from the mixed water outflow opening to multiple connected users;
wherein the pressure regulator is fluidically upstream of the piston and the thermostatic element;
wherein the piston and the thermostatic element are fluidically upstream of the flow diverter; and
wherein the flow diverter is located between: (1) the pressure regulator and (2) the piston and the thermostatic element.

16. The mixer valve of claim 15, wherein the valve body includes an upper element, a lower element, and an in-between element.

17. The mixer valve of claim 16, wherein the valve body further includes a cylindrical portion.

18. The mixer valve of claim 15, wherein the pressure regulator includes a partitioning diaphragm, the partitioning diaphragm including a first hollow tubular element and a second hollow tubular element, the second hollow tubular element being operable to slide inside the first hollow tubular element.

19. The mixer valve of claim 15, wherein the piston includes a plurality of ducts connecting the cold water inflow opening to the mixing chamber, the ducts having a throttling to accelerate the cold water flow into the mixing chamber.

20. The mixer valve of claim 15, wherein the thermostatic element is a thermostatic bulb that is operable to expand based on the temperature of the mixed water flow.

21. The mixer valve of claim 15, wherein the flow diverter includes a fixed plate and a movable plate, the movable plate being operable to rotate relative to the fixed plate.

* * * * *